US010998776B2

(12) United States Patent
Chen et al.

(10) Patent No.: US 10,998,776 B2
(45) Date of Patent: May 4, 2021

(54) WIRELESS POWER SYSTEM WITH IN-BAND COMMUNICATIONS

(71) Applicant: Apple Inc., Cupertino, CA (US)

(72) Inventors: Weiyun Chen, Los Gatos, CA (US); Stephen C. Terry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/748,467

(22) Filed: Jan. 21, 2020

(65) Prior Publication Data

US 2020/0328630 A1 Oct. 15, 2020

Related U.S. Application Data

(60) Provisional application No. 62/832,795, filed on Apr. 11, 2019.

(51) Int. Cl.
| | | |
|---|---|---|
| *H02J 50/80* | (2016.01) | |
| *H04Q 9/00* | (2006.01) | |
| *H02J 7/02* | (2016.01) | |
| *H02J 50/12* | (2016.01) | |

(52) U.S. Cl.
CPC .............. *H02J 50/80* (2016.02); *H02J 7/02* (2013.01); *H02J 50/12* (2016.02); *H04Q 9/00* (2013.01); *H04Q 2213/03* (2013.01)

(58) Field of Classification Search
CPC .. H02J 50/08; H02J 50/12; H02J 7/02; H04Q 9/00; H04Q 2213/03
See application file for complete search history.

(56) References Cited

U.S. PATENT DOCUMENTS

| | | |
|---|---|---|
| 9,094,055 B2 | 7/2015 | Low et al. |
| 9,787,141 B2 | 10/2017 | Karalis et al. |
| 9,985,442 B2 | 5/2018 | Von Novak, III et al. |
| 9,991,742 B2 | 6/2018 | Mao |
| 10,097,011 B2 | 10/2018 | Kesler et al. |
| 10,170,937 B2 | 1/2019 | Menegoli |
| 10,290,418 B2 | 5/2019 | Ryu et al. |
| 10,326,315 B2 | 6/2019 | Bae et al. |
| 10,454,312 B2 | 10/2019 | Mao et al. |
| 10,483,804 B2 | 11/2019 | Muratov |

(Continued)

FOREIGN PATENT DOCUMENTS

| | | |
|---|---|---|
| EP | 2806528 A1 | 11/2014 |
| GB | 2414121 A | 11/2005 |

*Primary Examiner* — Robert L Deberadinis
(74) *Attorney, Agent, or Firm* — Treyz Law Group, P.C.; G. Victor Treyz; Jason Tsai

(57) ABSTRACT

A wireless power receiving device has a coil that receives wireless power signals from a wireless power transmitting device and has a rectifier that produces direct-current power across rectifier output terminals using the received wireless power signals. A load in the wireless power receiving device receives a direct-current output voltage from the rectifier output terminals. In-band communications are supported in which an amplitude-shift keying communications scheme or other communications scheme is used by a data transmitter in the wireless power receiving device to transmit in-band data through the coil. In-band data is transmitted by modulating one or more transistors that are coupled to the coil and other wireless power receiving circuitry in series with one or more capacitors and is transmitted by modulating current flow through a ballast transistor or other adjustable load that is coupled across the rectifier output terminals.

21 Claims, 2 Drawing Sheets

(56) References Cited

U.S. PATENT DOCUMENTS

| | | |
|---|---|---|
| 2010/0171369 A1 | 7/2010 | Baarman et al. |
| 2011/0065398 A1 | 3/2011 | Liu et al. |
| 2012/0307873 A1 | 12/2012 | Kim et al. |
| 2015/0073768 A1 | 3/2015 | Kurs et al. |
| 2015/0249483 A1 | 9/2015 | Ichikawa et al. |
| 2017/0093168 A1 | 3/2017 | Von Novak, III et al. |
| 2017/0093218 A1 | 3/2017 | Hrinya et al. |
| 2018/0109145 A1 | 4/2018 | Von Novak, III et al. |
| 2018/0212469 A1 | 7/2018 | Liu et al. |
| 2018/0219524 A1 | 8/2018 | Govindaraj |

WIRELESS POWER SYSTEM WITH IN-BAND COMMUNICATIONS

This application claims the benefit of provisional patent application No. 62/832,795, filed Apr. 11, 2019, which is hereby incorporated by reference herein in its entirety.

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has a coil and rectifier circuitry. The coil of the portable electronic device receives alternating-current wireless power signals from a coil in the wireless charging mat. The rectifier circuitry converts the received signals into direct-current power.

SUMMARY

A wireless power system has a wireless power transmitting device and a wireless power receiving device. The wireless power receiving device has a coil that receives wireless power signals from the wireless power transmitting device and has a rectifier that produces direct-current power across rectifier output terminals using the received wireless power signals. A load in the wireless power receiving device receives a direct-current output voltage from the rectifier output terminals.

The system supports in-band communications in which an amplitude-shift keying communications scheme or other communications scheme is used by a data transmitter in the wireless power receiving device to transmit in-band data through the coil.

Capacitor switching circuitry or other switchable circuitry for adjusting the impedance of the wireless power receiving circuitry in the wireless power receiving device may be coupled to the coil. A ballast load such as a ballast transistor or other adjustable load may be coupled across the rectifier output terminals. A current source may monitor current flow through the load.

During start-up operations, the ballast load may be used to shunt a current between the rectifier output terminals. This ensures that a minimum amount of current passes between the rectifier output terminals while the wireless power receiving device is receiving power, even if the load of the wireless power receiving device is not yet passing current. Once current begins flowing through the load, the ballast load may be turned off or the amount of current passing through the ballast transistor may otherwise be reduced.

When it is desired to transmit in-band data, the data transmitter may supply control signals to the ballast transistor or to one or more transistors in the capacitor switching circuitry. This transmits data through the coil to a data receiver in the wireless power transmitting device.

The components that are modulated to transmit the in-band data can be selected based on load conditions. For example, in response to determining that light loading conditions are present (e.g., the current flowing through the load is less than a predetermined threshold value), the data transmitter can transmit in-band data by modulating the ballast transistor. In response to determining that heavy loading conditions are present (e.g., the current flowing through the load is more than the predetermined threshold value), the data transmitter can transmit in-band data by modulating one or more transistors in the capacitor switching circuitry.

DETAILED DESCRIPTION

A wireless power system includes a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

The wireless power transmitting device communicates with the wireless power receiving device and obtains information on the characteristics of the wireless power receiving device. In some embodiments, the wireless power transmitting device has multiple power transmitting coils. In such embodiments, the wireless power transmitting device uses information from the wireless power receiving device and measurements made in the wireless power transmitting device to determine which coil or coils in the transmitting device are magnetically coupled to wireless power receiving devices. Coil selection is then performed in the wireless power transmitting device. Wireless power is transmitted from the wireless power transmitting device to the wireless power receiving device using selected coil(s) to charge a battery in the wireless power receiving device and/or to power other load circuitry.

When it is desired for the wireless power transmitting device to send information to the wireless power receiving device, the wireless power transmitting device transmits data to the wireless power receiving device by modulating the frequency of the alternating-current wireless power signal that is being transmitted to the wireless power receiving device. This frequency modulation is sometimes referred to as frequency-shift keying (FSK) modulation. In the wireless power receiving device, an FSK demodulator can demodulate the frequency of the received alternating-current wireless power signal and can thereby receive the data transmitted from the wireless power transmitting device.

When it is desired for the wireless power receiving device to send information to the wireless power transmitting device, the wireless power receiving device transmits data to the wireless power transmitting device by modulating components in the wireless power receiving device. This modulation causes fluctuations in the impedance of the wireless power receiving circuitry seen by the transmitted wireless power signal. Modulation of the impedance of the receiving circuitry in this way modulates the amplitude (and phase) of the transmitted wireless power signal and results in detectable changes in the alternating-current being used to drive the wireless power transmitting coil. This type of modulation is sometimes referred to as amplitude-shift keying (ASK). Using FSK and ASK communications and/or other in-band and/or out-of-band communications, the devices in the wireless power transmitting system can coordinate operation.

Figure 1:
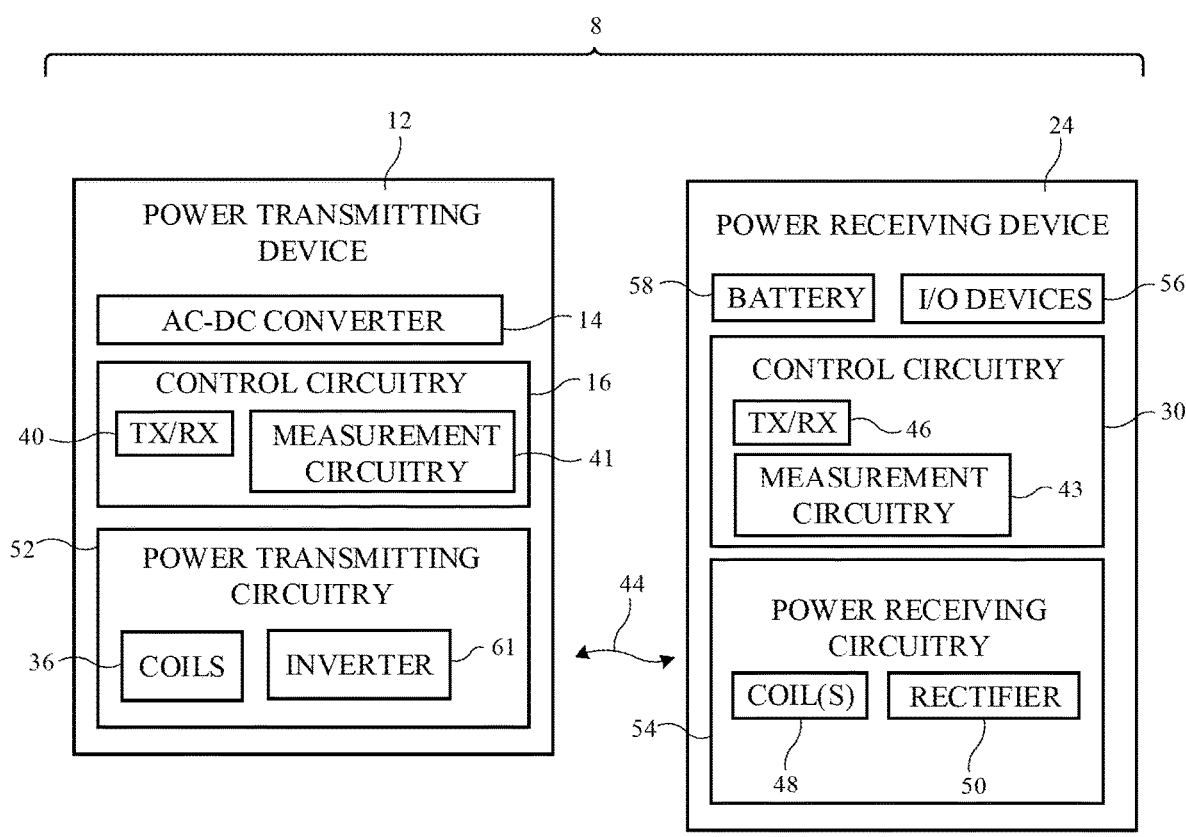
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat are sometimes described herein as an example.

Power receiving device 24 may be a portable electronic device such as a wristwatch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as transmit coils 36. Coils 36 may be arranged in a planar coil array (e.g., in configurations in which device 12 is a wireless charging mat).

As the AC currents pass through one or more coils 36, alternating-current electromagnetic (e.g., magnetic) fields (signals 44) are produced that are received by one or more corresponding receiver coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltage produced by rectifier 50 (sometime referred to as rectifier output voltage Vrect) can be used in charging a battery such as battery 58 and can be used in powering other components in device 24. For example, device 24 may include input-output devices 56 such as a display, touch sensor, communications circuits, audio components, sensors, light-emitting diode status indicators, other light-emitting and light detecting components, and other components and these components (which form a load for device 24) may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48.

It is desirable for power transmitting device 12 and power receiving device 24 to be able to communicate information such as received power, states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

During wireless power transfer operations, wireless transceiver circuitry 40 can use one or more coils 36 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions. Other types of in-band communications may be used, if desired.

During wireless power transmission operations, circuitry 52 supplies AC drive signals to one or more coils 36 at a given power transmission frequency. The power transmission frequency may be, for example, a predetermined frequency of about 125 kHz, about 200 kHz, at least 80 kHz, at least 100 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

Figure 2:
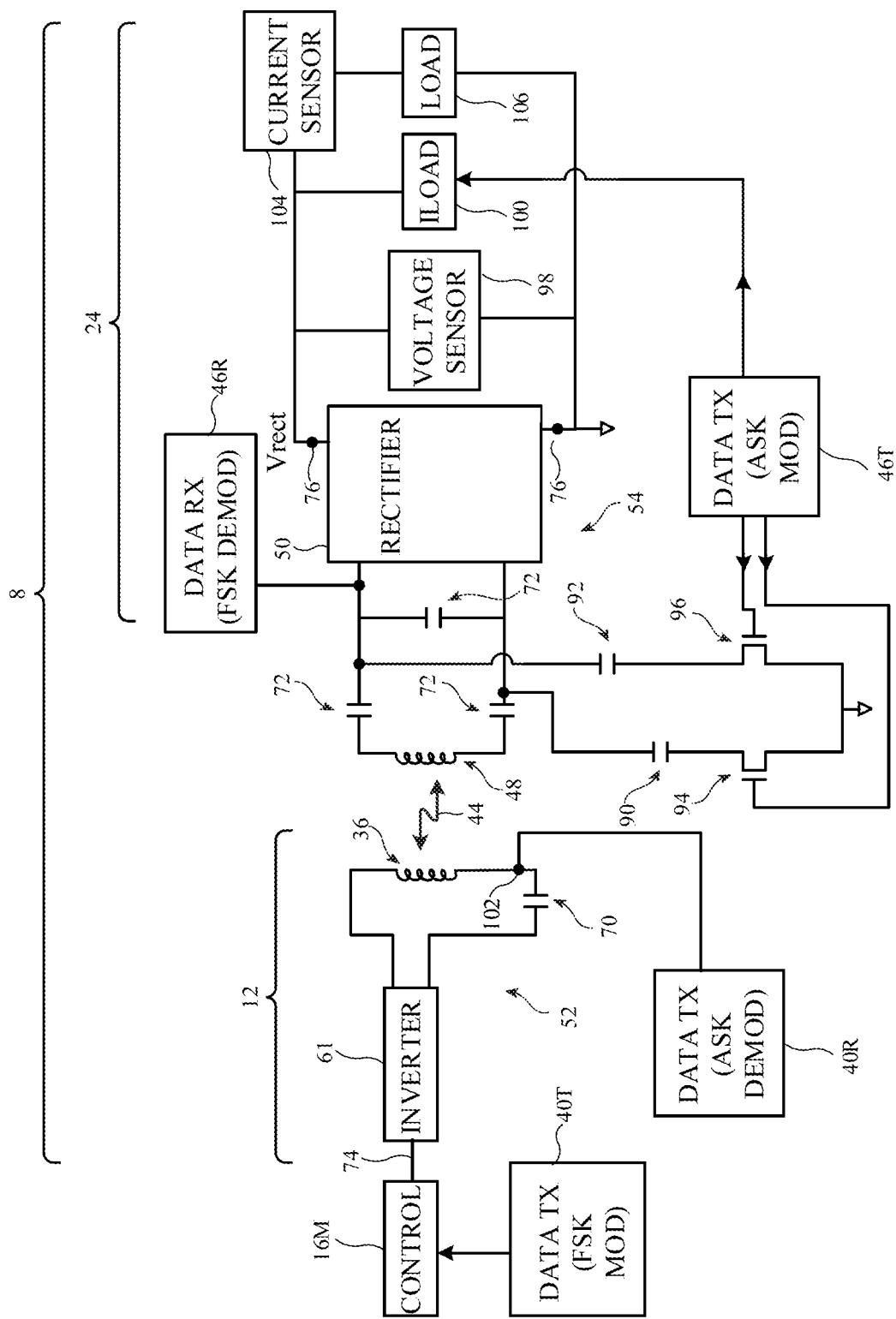
FIG. 2 is a circuit diagram of wireless power transmitting and receiving circuitry in accordance with an embodiment.

During wireless power transfer operations, while power transmitting circuitry 52 is driving AC signals into one or more of coils 36 to produce signals 44 at the power transmission frequency, wireless transceiver circuitry 40 uses FSK modulation to modulate the power transmission frequency of the driving AC signals and thereby modulate the frequency of signals 44. As shown in FIG. 2, FSK modulator 40T may modulate the drive frequency fd that is being supplied by controller 16M to input 74 of inverter 61. In this way, FSK data is transmitted from device 12 to device 24. In device 24, coil 48 is used to receive signals 44. Power receiving circuitry 54 uses the received signals on coil 48 and rectifier 50 to produce DC power. At the same time, wireless transceiver circuitry 46 (e.g., FSK demodulator 46R) uses FSK demodulation to extract the transmitted in-band data from signals 44. This approach allows FSK data (e.g., FSK data packets) to be transmitted in-band from device 12 to device 24 with coils 36 and 48 while power is simultaneously being wirelessly conveyed from device 12 to device 24 using coils 36 and 48.

In-band communications between device 24 and device 12 uses ASK modulation and demodulation techniques. Wireless transceiver circuitry 46 transmits in-band data to device 12 by using capacitance switching circuitry (e.g., one or more transistors in transceiver 46 that are coupled coil 48 in series with one or more capacitors) or by using an adjustable load (e.g., a ballast load transistor) to modulate the impedance of power receiving circuitry 54 (e.g., coil 48). This, in turn, modulates the amplitude of signal 44 and the amplitude of the AC signal passing through coil(s) 36. Wireless transceiver circuitry 40 monitors the amplitude of the AC signal passing through coil(s) 36 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 36 while power is simultaneously being wirelessly conveyed from device 12 to device 24 using coils 36 and 48. The use of ASK modulation in device 24 can affect both the phase and magnitude of the received signals in device 12, so ASK demodulation operations may, if desired, be performed using data receiver circuitry that is sensitive to both changes in magnitude and changes in phase. As an example, IQ (in-phase and quadrature) receiver circuitry in the data receiver of device 12 may be used in receiving ASK data transmitted from device 24.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. During object detection and characterization operations, external object measurement circuitry 41 can be used to make measurements on coils 36 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, switching circuitry in device 12 may be adjusted by control circuitry 16 to switch each of coils 36 into use. As each coil 36 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements.

The characteristics of each coil 36 depend on whether any foreign objects overlap that coil (e.g., coins, wireless power receiving devices, etc.) and also depend on whether a wireless power receiving device with a coil such as coil 48 of FIG. 1 is present, which could increase the measured inductance of any overlapped coil 36. Signal measurement circuitry 41 is configured to apply signals to the coil and measure corresponding signal responses. For example, signal measurement circuitry 41 may apply an alternating-current probe signal while monitoring a resulting signal at a node coupled to the coil. As another example, signal measurement circuitry 41 may apply a pulse to the coil and measure a resulting impulse response (e.g., to measure coil inductance). Using measurements from measurement circuitry 41, the wireless power transmitting device can determine whether an external object is present on the coils. If, for example, all of coils 36 exhibit their expected nominal response to the applied signals, control circuitry 16 can conclude that no external devices are present. If one of coils 36 exhibits a different response (e.g., a response varying from a normal no-objects-present baseline), control circuitry 16 can conclude that an external object (potentially a compatible wireless power receiving device) is present. Configurations in which an array of temperature sensors, optical sensors, and/or other sensors are used to help identify objects on the charging surface of device 12 may also be used.

Control circuitry 30 has measurement circuitry 43. In an illustrative arrangement, measurement circuitry 43 of control circuitry 30 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, device 24 may use measurement circuitry 43 to make measurements to characterize device 24 and the components of device 24. For example, device 24 may use measurement circuitry 43 to measure the inductance of coil 48 (e.g., signal measurement circuitry 43 may be configured to measure signals at coil 48 while supplying coil 48 with signals at one or more frequencies (to measure coil inductances), signal pulses (e.g., so that impulse response measurement circuitry in the measurement circuitry can be used to make inductance and Q factor measurements), etc. Measurement circuitry 43 may also make measurements of the output voltage of rectifier 50, the output current of rectifier 50, etc.

FIG. 2 is a circuit diagram of illustrative wireless charging circuitry for system 8. As shown in FIG. 2, circuitry 52 may include an inverter such as inverter 61 or other drive circuit that produces wireless power signals that are transmitted through an output circuit that includes one or more coils 36 and capacitors such as capacitor 70. Control signals for inverter 61 are provided by control circuitry 16 at control input 74. A single coil 36 is shown in the example of FIG. 2, but multiple coils 36 may be used, if desired. During wireless power transmission operations, transistors in inverter 61 are driven by AC control signals from control circuitry 16 (e.g., controller 16M supplies drive signals for inverter 61 at input 74 at a desired alternating-current drive frequency fd). This causes the output circuit formed from coil 36 and capacitor 70 to produce alternating-current electromagnetic fields (signals 44) that are received by wireless power receiving circuitry 54 using a wireless power receiving circuit formed from coil 48 and one or more capacitors 72 in device 24. Rectifier 50 converts received power from AC to DC and supplies a corresponding direct current output voltage Vrect across rectifier output terminals 76 for powering load circuitry (load 106) in device 24 (e.g., for charging battery 58, for powering a display and/or other input-output devices 56, and/or for powering other circuitry in load 106). Data can be transmitted from device 12 to device 24 using frequency shift keying (FSK) or other suitable modulation scheme. For example, data can be transmitted by using FSK modulator (data transmitter) 40T to control controller 16M and thereby modulate frequency fd. This data can be received in device 24 by using FSK demodulator 46R (data receiver RX) to perform FSK demodulation operations.

Circuitry 54 has voltage regulator circuitry that helps stabilize the voltage Vrect during operation of system 8. The voltage regulator circuitry may include a voltage sensor such as voltage sensor 98 that monitors the voltage Vrect and an adjustable load such as ballast load 100 that is coupled between output terminals 76 (e.g., a transistor that has first and second source-drain terminals coupled respectively to the positive and ground terminals 76 and that has a gate that receives a control signal from ASK modulator 46T) and that is used to shunt current between terminals 76 (e.g., to help stabilize voltage Vrect). Ballast load 100, which may sometimes be referred to as a ballast transistor, adjustable load, adjustable ballast load transistor, adjustable current load, or adjustable ballast load, is used to help ensure that there is always a minimum current flowing between output terminals 76, even if the components in load 106 have not yet been activated (e.g., during start-up). For example, ballast load 100 may be adjusted to draw a predetermined current (e.g., 50 mA) when device 24 initially receives power (e.g., before the battery charging circuitry for battery 58, the display, and/or other input-output devices 56 of load 106 start to draw significant current).

Current sensor 104 may be used to detect current flow through load 106. When it is determined that current is flowing to load 106 (e.g., battery 58 is being charged and/or other load components such as a display, communications circuitry, control circuitry, and other devices are drawing current), control circuitry 30 of device 24 can apply a control signal to the gate or other control terminal of ballast load 100 that turns ballast load 100 off or otherwise reduces the current flow through ballast load 100 (e.g., to reduce undesired power consumption due to current flow through ballast load 100). In this way, ballast load 100 serve as a ballast that helps to ensure sufficient loading is present during modes of operation in which load 106 is not drawing significant current. Ballast load 100 draws current when load 106 is inactive and is not drawing current. When load 106 is active and is drawing current, ballast load 100 is turned off or otherwise is adjusted to draw less current than when load 106 is inactive.

Wireless transceiver circuitry 46 of device 24 may include a data transmitter such as data transmitter 46T. During in-band communications (e.g., ASK communications) between device 24 and device 12, control circuitry 30 can modulate components in device 24 to modulate the impedance of the wireless power receiving circuitry of device 24 that is seen by the wireless power transmitting circuitry of device 12. For example, device 24 may use data transmitter 46T to apply control signals to the gate of ballast load 100 and/or to the gate of one or more transistors in capacitance switching circuitry or other switching circuitry coupled to coil 48. As shown in FIG. 2, device 24 may have capacitance switching circuitry formed from transistors such as transistors 94 and 96 that are coupled in series with capacitors 90 and 92, respectively, and that are coupled to the power receiving circuitry formed from coil 48 and capacitors 72. During in-band transmission, control circuitry 30 can apply control signals (e.g., transmitted data signals) to the gates of transistors such as transistors 94 and 96. Transistors 94 and 96 may be coupled to the input circuit of device 24 that is formed from coil 48 and capacitors 72 using respective capacitors 90 and 92 and may form capacitance switching circuitry (capacitance modulation circuitry) that can be used to modulate the capacitance coupled to wireless power receiving circuitry 54.

By turning on and off transistors 94 and 96 (e.g., by turning these transistors on together and off together to represent either digital data ones or digital data zeros), the capacitances associated with capacitors 94 and 96 are alternately connected and disconnected from the input circuitry of wireless power receiving circuit 54 and the impedance of coil 48 seen by wireless power transmitting circuitry 52 of device 12 is varied accordingly. The modulation of the input impedance of circuitry 52 modulates the flow of wireless power from coil 36 to coil 48 and thereby modulates the magnitude of the voltage (and, if desired, the phase of the voltage) of the signal on node 102 in device 12.

The magnitude of the voltage (and, if desired, the phase of the voltage) on node 102 may also be modulated by modulating the amount of current passing through ballast load 100 (e.g., by using transmitter 46T to adjust the control signal voltage on the gate of a transistor serving as ballast load 100, which also affects the input impedance of circuitry 52).

Wireless transceiver circuitry 40 of device 12 includes data receiver 40R (e.g., a receiver that measures changes in the amplitude and/or phase of the signal on node 102). During operation, ASK data that is transmitted by ASK modulator (data transmitter) 46T passes as in-band data from coil 48 to coil 36 and is received by ASK demodulator (data receiver) 40R.

In some operating conditions (e.g., certain values of coil inductance, load conditions, electromagnetic coupling between coils, etc.), the transmission of in-band data by modulating the capacitance coupled between circuitry 54 and ground using transistors 94 and 96 may result in more ripple in voltage Vrect than desired, particularly during light loading. This can give rise to excessive Vrect values and undesired triggering of overvoltage protection circuitry in device 24. In scenarios in which the communications frequency of the in-band communications data lies in the audible frequency range (e.g., at 2 kHz, etc.), this may also give rise to a risk of undesired audible buzzing.

Modulation of the current that flows through ballast load 100, on the other hand, always causes Vrect to swing lower and thereby avoids potential issues with overvoltage protection circuit triggering. The modulation current amplitude associated with ballast load 100 can also be dynamically adjusted by transmitter 46T (e.g., the modulation depth achieved when using ballast load 100 can be programmed by control circuitry 30). This allows in-band signal strength to be increased if needed to ensure satisfactory communications and to otherwise be decreased to help minimize power loss. Ballast load 100 may also be used for load ballasting, so ballast load 100 can serve dual purposes in device 24—e.g., to help with 1) load ballasting and 2) modulating load current to transmit in-band data. This dual use of ballast load 100 can reduce hardware costs.

When ballast load 100 is turned on, current flows through ballast load 100, which consumes power, so the use of capacitor-based impedance modulation (using, e.g., transistors 94 and 96 or other switching circuitry to adjust the capacitance coupled to coil 48) can be helpful in high load conditions where Vrect ripple is not likely to be excessive and overvoltage protection is not likely to be triggered due to ripple. The use of ballast load 100 (e.g., the use of load modulation which causes the voltage on Vrect to drop and not to swing upward) for in-band data communications can be helpful in low (light) load conditions where system 8 is more sensitive to potentially triggering overvoltage protection due to Vrect ripple. The use of ballast load 100 in this light loading conditions may allow the use of higher Vrect operating voltages.

Based on these considerations, device 24 can therefore use load modulation with ballast load 100 for in-band communications under light loading conditions (when the current through load 106 is detected by current sensor 104 as being below a predetermined threshold current value) and can use capacitance modulation with capacitance switching circuitry (e.g., using transistors 94 and 96) for in-band communications under heavy loading conditions (when control circuitry 30 determines from the load current measurements of sensor 104 that the load current is above the predetermined threshold current value).

In device 12, data receiver 40R can be used to demodulate in-band data that is transmitted by device 24 in both light loading and heavy loading conditions. Any suitable receiver circuitry can be included in receiver 40R to measure changes to the magnitude (and, if desired, phase) of the voltage on node 102. This circuitry may, for example, include IQ demodulation circuitry.

The foregoing is merely illustrative and various modifications can be made to the described embodiments. The foregoing embodiments may be implemented individually or in any combination.

What is claimed is:

1. A wireless power receiving device configured to wirelessly receive power during wireless power transmission from a wireless power transmitting device, comprising:
    wireless power receiving circuitry that includes a coil and rectifier, configured to:
        receive wireless power signals with the coil; and
        supply a corresponding output voltage across rectifier output terminals;
    an adjustable load coupled to the rectifier output terminals;
    capacitance switching circuitry coupled to the wireless power receiving circuitry; and
    control circuitry configured to:
        transmit data signals to the wireless power transmitting device, using the coil, by adjusting a capacitance coupled to the wireless power receiving circuitry with the capacitance switching circuitry; and
        transmit data signals to the wireless power transmitting device, using the coil, by adjusting the adjustable load.

2. The wireless power receiving device of claim 1 further comprising input-output devices and a battery that form a load that receives the output voltage in parallel with the adjustable load.

3. The wireless power receiving device of claim 2 further comprising a current sensor, wherein the control circuitry is configured to use the current sensor to measure a current flowing through the load.

4. The wireless power receiving device of claim 3 wherein the control circuitry has an in-band data transmitter and is configured to use the in-band data transmitter to transmit the data signals by modulating the capacitance with the capacitance switching circuitry in response to measuring that the current flowing through the load is greater than a threshold value.

5. The wireless power receiving device of claim 3 wherein the control circuitry has an in-band data transmitter and is configured to use the in-band data transmitter to transmit the in-band data signals by modulating the adjustable load in response to measuring that the current flowing through the load is less than a predetermined value.

6. The wireless power receiving device of claim 5 wherein the adjustable load comprises a transistor having source-drain terminals coupled respectively to the output terminals and having a gate that is configured to receive the data signals from the in-band data transmitter.

7. The wireless power receiving device of claim 6 wherein the capacitance switching circuitry comprises at least one capacitor and at least one transistor coupled in series between the coil and ground.

8. The wireless power receiving device of claim 6 wherein the capacitance switching circuitry comprises first and second capacitors coupled in series respectively with first and second transistors.

9. The wireless power receiving device of claim 2 wherein the control circuitry is configured to adjust the adjustable load to pass a current while waiting for the input-output devices to begin drawing current after the wireless power transmission from the wireless power transmitting device is initiated.

10. A wireless power receiving device configured to wirelessly receive power during wireless power transmission from a wireless power transmitting device, comprising:
    a coil;
    a rectifier configured to:
        rectify wireless power signals received with the coil; and
        supply a corresponding output voltage across rectifier output terminals;
    a load that receives the output voltage;
    a ballast load coupled across the rectifier output terminals;

a current sensor configured to measure current flow through the load; and control circuitry having a data transmitter, wherein the control circuitry is configured to:
- adjust the ballast load based on information from the current sensor; and
- use the data transmitter to adjust current flow through the ballast load to transmit data from the coil to the wireless power transmitting device.

11. The wireless power receiving device of claim 10 wherein the load comprises input-output devices and wherein the control circuitry is configured to adjust the ballast load to pass a current while waiting for the input-output devices to begin drawing current after the wireless power transmission from the wireless power transmitting device is initiated.

12. The wireless power receiving device of claim 11 further comprising capacitance switching circuitry coupled to the coil, wherein the control circuitry is configured to use the data transmitter to transmit data to the wireless power transmitting device by using the capacitance switching circuitry to adjust a capacitance coupled to the coil.

13. The wireless power receiving device of claim 10 further comprising at least one capacitor and at least one transistor coupled to the coil in series, wherein the control circuitry is configured to:
- transmit data from the coil to the wireless power transmitting device by adjusting the transistor that is coupled in series with the capacitor in response to measuring with the current sensor that a current flowing through the load is greater than a predetermined threshold value.

14. The wireless power receiving device of claim 13 wherein the control circuitry is configured to:
- use the data transmitter to adjust current flow through the ballast load to transmit data from the coil to the wireless power transmitting device in response to measuring with the current sensor that the current flowing through the load is less than the predetermined threshold value.

15. The wireless power receiving device of claim 10 wherein the load includes a battery.

16. A wireless power receiving device configured to wirelessly receive power during wireless power transmission from a wireless power transmitting device, comprising:
- a coil;
- a rectifier that is configured to rectify wireless power signals received with the coil and that is configured to supply a corresponding output voltage across rectifier output terminals;
- a load that includes a display and a battery and that receives the output voltage;
- a first transistor coupled to the rectifier output terminals;
- a capacitor;
- a second transistor coupled to the coil in series with the capacitor;
- control circuitry having a data transmitter, wherein the control circuitry is configured to:
  - use the data transmitter to transmit data signals through the coil by adjusting current flow through the first transistor; and
  - use the data transmitter to transmit data signals through the coil by adjusting the second transistor.

17. The wireless power receiving device of claim 16 further comprising a current sensor configured to measure current flow through the load, wherein the control circuitry is configured to:
- use the data transmitter to transmit data signals through the coil by adjusting current flow through the first transistor in response to measuring with the current sensor that the current flowing through the load is less than a predetermined value.

18. The wireless power receiving device of claim 17 wherein the control circuitry is configured to:
- use the data transmitter to transmit data signals through the coil by adjusting the second transistor in response to measuring with the current sensor that the current flowing through the load is more than the predetermined value.

19. The wireless power receiving device of claim 16 further comprising a current sensor configured to measure current flow through the load, wherein the first transistor forms an adjustable load, and wherein the control circuitry is configured to:
- adjust the adjustable load based on information from the current sensor.

20. The wireless power receiving device of claim 19 wherein the control circuitry is configured to adjust the adjustable load to: 1) pass a fixed ballast current while waiting for the load to begin drawing current after the wireless power transmission from the wireless power transmitting device is initiated and 2) pass less than the fixed ballast current after the load begins drawing current.

21. The wireless power receiving device of claim 16 wherein the data transmitter has a first output coupled to a gate of the first transistor and a second output coupled to a gate of the second transistor and wherein the data transmitter is configured to transmit amplitude-shift keying data signals through the coil using the first transistor and is configured to transmit amplitude-shift keying data signals through the coil using the second transistor.

* * * * *